(12) United States Patent
Sim

(10) Patent No.: US 9,383,279 B2
(45) Date of Patent: Jul. 5, 2016

(54) INSTALLATION STRUCTURE FOR PEDAL STROKE SENSOR

(71) Applicant: MANDO CORPORATION, Pyeongtaek-si, Gyeonggi-do (KR)

(72) Inventor: Gyung-Hun Sim, Anyang-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 239 days.

(21) Appl. No.: 14/275,609

(22) Filed: May 12, 2014

(65) Prior Publication Data
US 2014/0331758 A1 Nov. 13, 2014

(30) Foreign Application Priority Data
May 13, 2013 (KR) .......................... 10-2013-0053549

(51) Int. Cl.
*G01L 5/28* (2006.01)
*B60T 7/06* (2006.01)
*B60T 7/04* (2006.01)

(52) U.S. Cl.
CPC . *G01L 5/28* (2013.01); *B60T 7/042* (2013.01); *B60T 7/06* (2013.01); *B60T 2220/04* (2013.01)

(58) Field of Classification Search
CPC ........................................................ G01L 5/28
USPC .................................... 73/121, 128, 129, 132
See application file for complete search history.

(56) References Cited

U.S. PATENT DOCUMENTS

| 5,217,280 | A  | * | 6/1993  | Nykerk  | .............. | B60G 17/0195 188/158 |
| 6,330,838 | B1 | * | 12/2001 | Kalsi   | ...................... | B60K 26/02 200/61.89 |
| 6,805,022 | B1 | * | 10/2004 | Steindl | ................... | B60K 26/02 73/1.75 |

(Continued)

FOREIGN PATENT DOCUMENTS

| CN | 102686980 A  | 9/2012 |
| CN | 202811934 U  | 3/2013 |

(Continued)

OTHER PUBLICATIONS

Chinese Office Action issued in corresponding Chinese Patent Application No. 201410201146.2, mailed on Jan. 26, 2016.

*Primary Examiner* — Eric S McCall
(74) *Attorney, Agent, or Firm* — McDermott Will & Emery LLP

(57) ABSTRACT

Disclosed is an installation structure of a pedal stroke sensor configured to measure a displacement of a moving member interworking according to a stepping force of a brake pedal. The pedal stroke sensor provided with a sensing member to sense a change in displacement according to movement of the moving member in a non-contact manner is installed at an outside of a housing that allows the moving member to be slid thereinto, the sensing member is provided with a sensor housing that is detachably installed at the outside of the housing, a hall IC (integrated circuit) provided in the sensor housing to sense change in magnetic force, and a magnet housing provided in the sensor housing so as to move while facing the hall IC and on which a magnet is installed, and an elongated hole is formed through an outer surface of the housing in a direction in which the moving member moves, and the moving member is connected to the magnet housing by using a connecting member such that the moving member moves together with the magnet housing through the elongated hole.

8 Claims, 5 Drawing Sheets

(56) References Cited

U.S. PATENT DOCUMENTS

| | | | |
|---|---|---|---|
| 2002/0117893 A1* | 8/2002 | Shaw | B60T 8/3255 303/113.4 |
| 2003/0000375 A1* | 1/2003 | Zumberge | B60T 8/4081 92/5 R |
| 2004/0187625 A1* | 9/2004 | Schiel | B60T 7/042 74/514 |
| 2006/0112931 A1* | 6/2006 | Meguro | G05G 1/38 123/399 |
| 2006/0169093 A1* | 8/2006 | Peniston | B60K 26/021 74/514 |
| 2010/0083789 A1* | 4/2010 | Osawa | B60K 26/02 74/513 |
| 2010/0294074 A1* | 11/2010 | Muraji | B60K 26/021 74/514 |
| 2011/0041647 A1* | 2/2011 | Soltys | B60T 7/042 74/560 |
| 2011/0113874 A1* | 5/2011 | Park | B60T 7/042 73/121 |
| 2012/0304799 A1* | 12/2012 | Noh | B60K 26/021 74/512 |
| 2013/0125638 A1* | 5/2013 | Miyazaki | B60T 7/042 73/132 |
| 2014/0083394 A1* | 3/2014 | Watanabe | B60K 26/02 123/399 |
| 2014/0130633 A1* | 5/2014 | Kumamoto | G01B 7/30 74/513 |
| 2014/0260767 A1* | 9/2014 | Wurn | G05G 1/40 74/512 |
| 2015/0362307 A1* | 12/2015 | Sim | G01R 33/0047 324/207.13 |

FOREIGN PATENT DOCUMENTS

| | | |
|---|---|---|
| CN | 103097217 A | 5/2013 |
| DE | 198 55 358 A1 | 6/2000 |
| DE | 10 2007 002 221 A1 | 7/2008 |
| DE | 10 2010 002 505 A1 | 9/2011 |
| FR | 2 840 865 A1 | 12/2003 |
| KR | 10-2004-0097694 B1 | 11/2004 |

* cited by examiner

INSTALLATION STRUCTURE FOR PEDAL STROKE SENSOR

CROSS-REFERENCE TO RELATED APPLICATION

This application claims the benefit of Korean Patent Application No. 2013-0053549, filed on May 13, 2013 in the Korean Intellectual Property Office, the disclosure of which is incorporated herein by reference.

BACKGROUND

1. Field

Embodiments of the present disclosure relate to an installation structure of a pedal stroke sensor, and more particularly, to an installation structure of a pedal stroke sensor ensuring easy assembly while simplifying a structure of the pedal stroke sensor.

2. Description of the Related Art

In general, a vehicle has a mechanism configured to detect a rotating angle of a pedal arm of a brake pedal or an accelerator pedal at all times, and based on the detected data, perform a precise control.

For example, a rotating angle of a pedal arm of a brake pedal is detected using a pedal stroke sensor to control a device in an electronic manner. Such a pedal stroke sensor is disclosed in Korean Patent Publication No. 10-2001-0053777, which is implemented in a way to detect an angle of a brake pedal. The pedal stroke sensor is installed adjacent to a hinge shaft allowing a pedal arm to be rotated thereon, so that a degree of the brake pedal proceeding is measured from a change in an output value according to a rotating angle of a brake pedal.

However, such a pedal stroke sensor based on angle detection, which is installed on a brake pedal spaced apart from a brake module, is subjected to a calibration for offset compensation in a state that the assembly is completed, thereby having inconvenience in use and poor quality thereof.

In addition, the rotating angle is detected in a contact manner, leading to a complex structure of the pedal stroke sensor, generating friction noise and having poor reliability of detection accuracy.

CITED REFERENCE

Patent Document

Korean Patent Publication No. 1 0-201 1-0053777 (HYUNDAI MOTOR, KIA MOTOR), May 24, 2011, FIGS. 1 to 5

SUMMARY

Therefore, it is an aspect of the present disclosure to provide an installation structure for a pedal stroke sensor capable of improving the durability while preventing friction noise by implementing a simple installation structure of the pedal stroke sensor in a non-contact type.

It is another aspect of the present disclosure to provide an installation structure for a pedal stroke sensor ensuring easy attach/detach of the pedal stroke sensor by mounting the pedal stroke sensor at an outside of a brake module.

Additional aspects of the disclosure will be set forth in part in the description which follows and, in part, will be obvious from the description, or may be learned by practice of the disclosure.

In accordance with one aspect of the present disclosure, an installation structure of a pedal stroke sensor configured to measure a displacement of a moving member interworking according to a stepping force of a brake pedal is provided. The pedal stroke sensor provided with a sensing member to sense a change in displacement according to movement of the moving member in a non-contact manner may be installed at an outside of a housing that allows the moving member to be slid thereinto. The sensing member may be provided with a sensor housing that is detachably installed at the outside of the housing, a hall IC (integrated circuit) provided in the sensor housing to sense change in magnetic force, and a magnet housing provided in the sensor housing so as to move while facing the hall IC and on which a magnet is installed. An elongated hole may be formed through an outer surface of the housing in a direction in which the moving member moves, and the moving member is connected to the magnet housing by using a connecting member such that the moving member moves together with the magnet housing through the elongated hole.

The installation structure may further include a guide plate between the sensor housing and the housing to guide the connecting member when the connecting member connected to the magnet housing moves together with the moving member.

The guide plate may be provided with a guide hole at a position thereof corresponding to the elongated hole.

The moving member may be provided with a coupling hole into which the connecting member is inserted.

A coupling part of the connecting member to which the moving member may be coupled is provided with a protrusion protruding outward, and the coupling hole is provided with a coupling groove that is undercut to maintain a tight coupling with respect to the protrusion.

The connecting member may be provided with a slit portion that is slit in a direction in which the connecting member is inserted into the coupling hole such that the connecting member is elastically deformed at the time of insertion.

The magnet housing may be provided with a supporting part on which the magnet is installed, and a shaft part coupled to the support part and protruding outward by passing through the sensor housing. The shaft part may be coupled to the connecting member.

The magnet housing may be integrally formed with the connecting member

As is apparent from the above, an installation structure of a pedal stroke sensor according to an embodiment of the present disclosure has the pedal stroke sensor installed so as to be attached or detached at an outside of a brake module, thereby ensuring easy reassembly of the pedal stroke sensor.

In addition, the pedal stroke sensor is assembled after being completed with calibration, thereby ensuring easy management of the pedal stroke sensor.

In addition, the pedal stroke sensor is provided in a non-contact type and provided with a simple structure, so that friction noise is minimized while ensuring improved durability, thereby improving the reliability of detecting a displacement.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
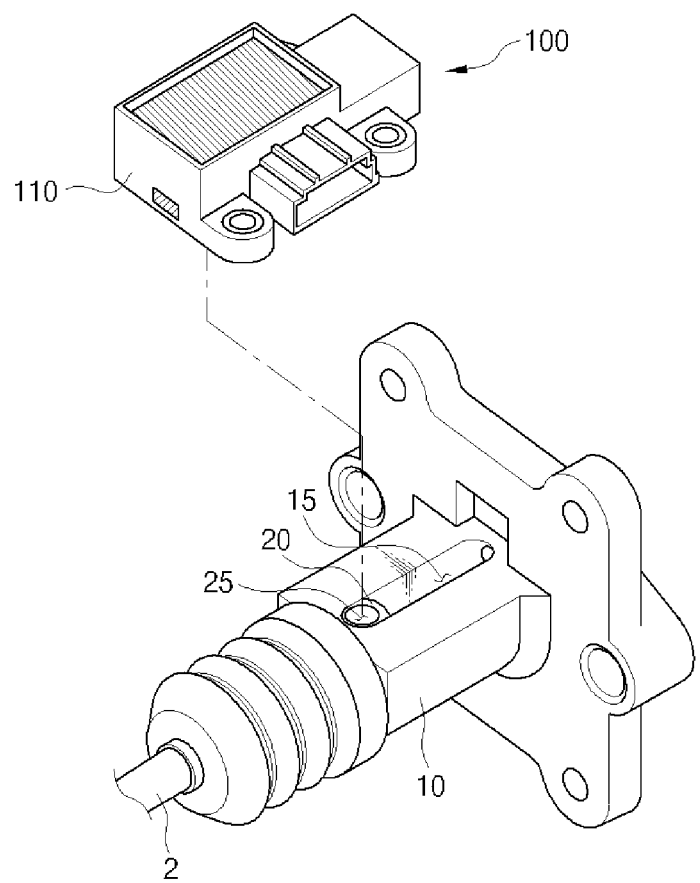
FIG. 1 is a perspective view illustrating a state of a pedal stroke sensor being installed on a housing in accordance with one embodiment of the preset disclosure.

Reference will now be made in detail to the embodiments of the present disclosure, examples of which are illustrated in the accompanying drawings, wherein like reference numerals refer to like elements throughout.

FIG. 1 is a perspective view illustrating a state of a pedal stroke sensor being installed on a housing in accordance with one embodiment of the preset disclosure.

Referring to FIG. 1, a housing 10 is provided to allow a moving member 20, which interworks according to a stepping force of a brake pedal (not shown), to be slid thereinto. In this case, the moving member 20 may be implemented using a control plunger connected to an input shaft 2 that moves in a horizontal direction by a stepping force of a brake pedal. Such a moving member 20, which is coupled to a sensor for sensing a displacement, may be used may be coupled to any device for sensing a stroke and used.

The housing 10 is provided at an outer surface thereof with a mounting surface on which a pedal stroke sensor is installed. An elongated hole 15 is formed through the mounting surface to communicate inside and outside the housing 10. The elongated hole 15 is formed in a direction in which the moving member 20 moves. The mounting surface is provided flat suitable for the pedal stroke sensor to be easily installed thereon.

The moving member 20 is provided with a coupling hole 25 to which a connecting member 150 is coupled. The coupling hole 25 is formed in a direction perpendicular to a moving direction of the moving member 20. The coupling hole 25 may be provided with a coupling groove 26 that is undercut such that a tight coupling between a protrusion 156 of the connecting member 150, which is to be described later, and the coupling hole 25 is maintained. The coupling structure between the coupling groove 26 and the protrusion 156 will be described below.

According to an embodiment of the present disclosure, the pedal stroke sensor is provided with a sensing member 100 to sense a change in displacement according to movement of the moving member 20. The sensing member 100 is implemented in a non-contact type mounted at an outside of the housing 10 to sense a displacement of the moving member 20.

In more detail, the sensing member 100 includes a sensor housing 110 detachably installed on the mounting surface provided at an outside of the housing 100, a hall IC (integrated circuit) 120 provided in the sensor housing 110 to sense change in a magnetic force, a magnet housing 140 provided in the sensor housing 110 so as to move while facing the hall IC 120, and a connecting member 150 connecting the moving member 20 to the magnet housing 140 such that the magnet housing 140 moves together with the moving member 20.

The sensor housing 110 is fixed to the housing 10, and the hall IC 120 sensing change in magnetic force due to change in position with respect to the magnet 140 is installed inside the sensor housing 110. In this case, the sensor housing 110 is coupled to the outside of the housing 10 through a bolt (not shown) so as to be easily attached and detached. Although not shown, a protrusion or groove may be provided at one side of the sensor housing 110 and a protrusion or groove corresponding to the protrusion or groove of the sensor housing 110 may be provided at the housing 10 so as to be coupled to the protrusion or groove of the sensor housing 110. That is, one side of the sensor housing 110 may be coupled to the housing 10 through a protrusion-groove coupling structure, and the other side of the sensor housing 110 may be bolted to the housing 10, thereby securing easy coupling between the sensor housing 110 and the housing 10.

Figure 3:
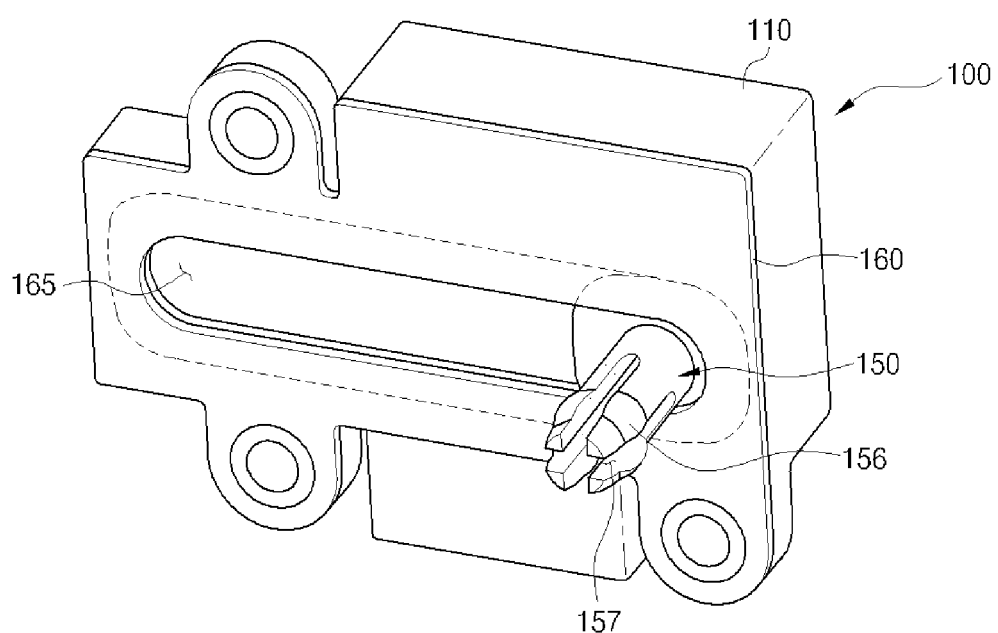
FIG. 3 is a side view illustrating a pedal stroke sensor being coupled to a moving member in accordance with one embodiment of the preset disclosure.

The magnet housing 140 is movably provided in the sensor housing 110. Referring to FIG. 3, the magnet housing 140 is provided at an upper side thereof with a supporting part 154 on which a magnet 130 generating a magnetic field and a shaft part 145 coupled to the supporting part 143 and protruding outward by a predetermined extent by passing through the sensor housing 110. The supporting part 143 is integrally formed with the shaft part 145. In this case, the magnet 130 is installed on the support part 143 so as to be spaced apart from the hall IC 120 by a predetermined distance, and the magnet housing 140 is provided to move while facing the hall IC 120.

The magnet housing 140 is coupled to the connecting member 150 coupled to the moving member 20. As shown in the drawings, the connecting member 150 has one end coupled to the shaft part 145 of the magnet housing 140 and the other end insertedly coupled to the coupling hole 25 formed through the moving member 20. Accordingly, the magnet housing 140 is provided to be moved together with the moving member 20 by the connecting member 150.

Although the above description has been made in relation that the magnet housing 140 has the shaft part 145 inserted into one end of the connecting member 150 so that the magnet housing 140 is coupled to the connecting member 150, the present disclosure is not limited thereto. The magnet housing 140 may be provided with a groove (not shown), and the connecting member 150 may have a shaft part (not shown) insertedly coupled to the groove.

Although not shown, the magnet housing 140 is integrally formed with the connecting member 150. That is, the magnet housing 140 may have the shaft part 145 extended downward to be insertedly coupled to the coupling hole 25 formed through the moving member 20.

It should be understood that various coupling structures of the magnet housing 140 and the connecting member 150 may be used for the installation structure of the pedal stroke sensor in accordance with an embodiment of the present disclosure.

Figure 2:
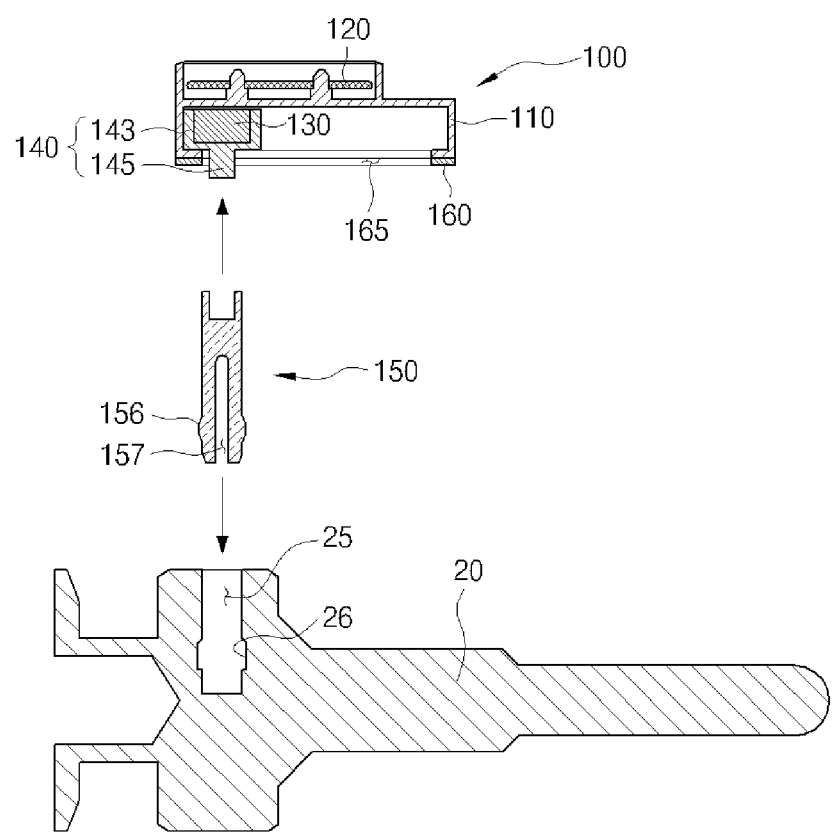
FIG. 2 is a bottom view illustrating a pedal stroke sensor in accordance with one embodiment of the preset disclosure.
Figure 4:
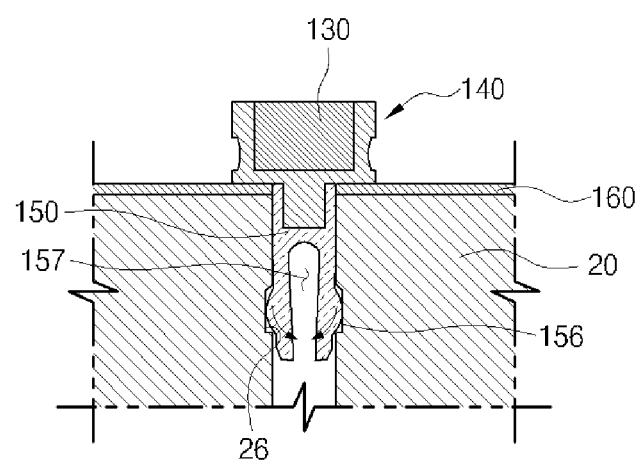
FIG. 4 is a partial enlarged view illustrating a connecting member provided on a pedal stroke sensor being coupled to a moving member in accordance with one embodiment of the preset disclosure.

Referring to FIGS. 2 to 4, the protrusion 156 protrudes at the other end of the connecting member 150, which represents a coupling part, coupled to the moving member 20. The protrusion 156 is provided to be inserted into the coupling groove 26 formed in the coupling hole 25 of the moving member 20. The coupling groove 26 formed by undercutting the coupling hole 25 is provided at a position corresponding to the protrusion 156 in a state that the assembly of the connecting member 150 is completed. Accordingly, a tight coupling is maintained between the moving member 20 and the connecting member 150.

Meanwhile, in order to reduce difficulty in assembling the protrusion 156, which protrudes outward, with the coupling hole 25, a slit portion 157 is formed at the coupling part of the connecting member 150. The slit portion 157 is slit to be elastically deformed in an axial direction when the connecting member 150 is inserted into the coupling hole 25. The slit portion 157 is slit in a direction in which the connecting member 150 is inserted into the coupling hole 157, that is, a lengthwise direction of the connecting member 150.

The magnet housing 140 connected to the moving member 20 through the connecting member 150 is provided in parallel to the moving member 20 so as to move together the moving member 20 when the moving member 20 moves in a lengthwise direction of the elongated hole 15.

In addition, a guide plate 160 is further provided between the sensor housing 110 and the housing 10 to guide the connecting member 150 when the connecting member 150 connected to the magnet housing 140 moves together with the moving member 20. The guide plate 160 is provided with a guide hole 165 at a position corresponding to the elongated hole 15. Accordingly, when the moving member 20 moves, the connecting member 150 is guided by the guide hole 165 and stably moved.

Hereinafter, a state of the pedal stroke sensor sensing a displacement according to change in movement of the moving member 20 will be described.

Figure 5:
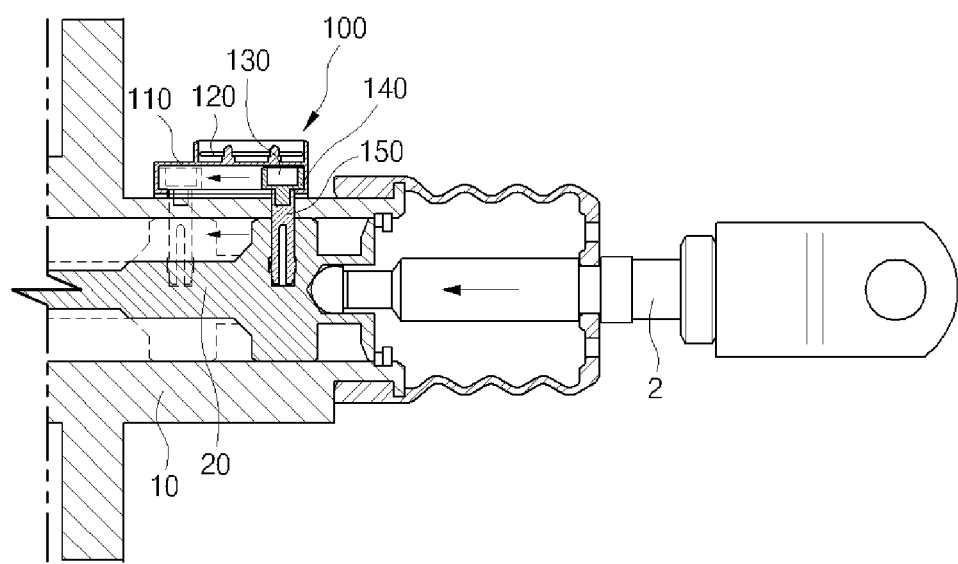
FIG. 5 is a cross sectional view illustrating an operating state of a pedal stroke sensor in accordance with one embodiment of the preset disclosure.

Referring to FIG. 5, when a driver steps on a brake pedal (not shown) for braking, the brake pedal operates such that the input shaft 2 connected to the brake pedal applies a pressure to a control plunger, that is, the moving member 20, thereby moving the moving member 20 forward. In this case, the magnet housing 140 is moved together with the moving member 20 by the connecting member 150 connected to the moving member 20. Accordingly, the sensing member 100, that is, the hall IC 120, senses a change in magnetic force with respect to the magnet 130 provided on the magnet housing 140, thereby sensing a displacement of the moving member 20.

As described above, when the displacement of the moving member 20 is sensed by the pedal stroke sensor, a sensed signal is output to an electronic control unit (not shown) to detect a mechanical momentum of the brake pedal, that is, the moving member 20. Accordingly, the brake system is controlled through the detected measured value of the moving member 20.

As the pedal stroke sensor according to the present disclosure is installed so as to be detached/attached at an outside of the brake module, easy reassembly of the pedal stroke sensor is ensured. In addition, since the pedal stroke sensor is assembled in a state of being completed with calibration, easy management of the pedal stroke sensor is ensured.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An installation structure of a pedal stroke sensor configured to measure a displacement of a moving member interworking according to a stepping force of a brake pedal,
   wherein the pedal stroke sensor provided with a sensing member to sense a change in displacement according to movement of the moving member in a non-contact manner is installed at an outside of a housing that allows the moving member to be slid thereinto;
   the sensing member is provided with a sensor housing that is detachably installed at the outside of the housing, a hall IC (integrated circuit) provided in the sensor housing to sense change in magnetic force, and a magnet housing provided in the sensor housing so as to move while facing the hall IC and on which a magnet is installed; and
   an elongated hole is formed through an outer surface of the housing in a direction in which the moving member moves, and the moving member is connected to the magnet housing by using a connecting member such that the moving member moves together with the magnet housing through the elongated hole.

2. The installation structure of claim 1, further comprising a guide plate between the sensor housing and the housing to guide the connecting member when the connecting member connected to the magnet housing moves together with the moving member.

3. The installation structure of claim 2, wherein the guide plate is provided with a guide hole at a position thereof corresponding to the elongated hole.

4. The installation structure of claim 1, wherein the moving member is provided with a coupling hole into which the connecting member is inserted.

5. The installation structure of claim 4, wherein a coupling part of the connecting member to which the moving member is coupled is provided with a protrusion protruding outward, and the coupling hole is provided with a coupling groove that is undercut to maintain a tight coupling with respect to the protrusion.

6. The installation structure of claim 4, wherein the connecting member is provided with a slit portion that is slit in a direction in which the connecting member is inserted into the coupling hole such that the connecting member is elastically deformed at the time of insertion.

7. The installation structure of claim 1, wherein:
   the magnet housing is provided with a supporting part on which the magnet is installed, and a shaft part coupled to the support part and protruding outward by passing through the sensor housing; and
   the shaft part is coupled to the connecting member.

8. The installation structure of claim 1, wherein the magnet housing is integrally formed with the connecting member.

\* \* \* \* \*